United States Patent [19]

Bachmann et al.

[11] E Re. 31,162

[45] Reissued Mar. 1, 1983

[54] DISPLAY PANEL FOR A VENDING MACHINE

[75] Inventors: G. Merle Bachmann, Stone Mountain; Homer C. Burrous, Atlanta; Walter L. Shelton, Marietta, all of Ga.

[73] Assignee: The Coca-Cola Company, Atlanta, Ga.

[21] Appl. No.: 351,465

[22] Filed: Feb. 23, 1982

Related U.S. Patent Documents

Reissue of:

[64] Patent No.: 4,245,730
Issued: Jan. 20, 1981
Appl. No.: 47,768
Filed: Jun. 12, 1979

[51] Int. Cl.[3] ..... G07F 5/18

[52] U.S. Cl. ..... 194/1 A; 221/131

[58] Field of Search ..... 194/1 A, 10, 13, 2, 194/3; 221/131, 132, 2, 4, 5; 222/2, 23, 28; 312/188; D20/4, 5

[56] References Cited

U.S. PATENT DOCUMENTS

| | | | |
|---|---|---|---|
| 2,852,043 | 9/1958 | Cooper | 194/13 X |
| 3,074,593 | 1/1963 | Krakauer | 194/10 |
| 4,124,109 | 11/1978 | Bissel et al. | 194/2 X |

*Primary Examiner*—Stanley H. Tollberg

*Attorney, Agent, or Firm*—Birch, Stewart, Kolasch & Birch

[57] ABSTRACT

The present invention is directed to a display panel for use in combination with two vending machine units. The vending machine units are positioned in a side-by-side arrangement and are bolted and operatively connected together to act as a single unit. The two vending machine units are controlled by a single coin mechanism which will enable an individual to select a primary product or one of a plurality of secondary products which are dispensed from either the first vending machine unit or the second vending machine unit. The display panel extends completely across the width dimension of both units and includes a logo thereon. A first vending machine unit includes an enlarged primary product selection button with the same product identification positioned thereon as the display panel and is disposed directly adjacent to a coin insertion slot. The second vending machine unit includes a plurality of secondary product selection buttons which are displaced away from the primary product selection button and the coin insertion slot of the first vending machine unit. Because of the large logo which appears on the display panel and the enlarged primary product selection button containing the same product identification and being disposed directly adjacent to the coin insertion slot, the attention of a potential consumer is attracted to effect a sale of the primary product.

21 Claims, 5 Drawing Figures

DISPLAY PANEL FOR A VENDING MACHINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to a display panel for use in combination with two vending machine units.

2. Description of the Prior Art

It is conventional in the vending machine art to display a logo of a particular product together with the vending machine. Usually, the logo of the primary product is positioned adjacent to the top portion of the machine and is again positioned adjacent to the logos of the secondary products which are arranged in a line of product selection buttons all disposed adjacent to a coin insertion slot. An individual wishing to purchase a product contained within the vending machine unit would insert the necessary change into the coin insertion slot and thereafter select the product he/she desires by actuating one of the product selection buttons.

In order to entice a potential consumer into purchasing the primary product instead of one of the secondary products some vending machine units [enlarge the size of the product selection button associated with the primary product so as to attract the consumer's attention. In addition, some conventional vending machines] position the primary product selection button directly adjacent to the coin insertion slot. However, [because of the limited space available on a single vending machine unit] the various arrangements discussed above have not been very successful in attracting a potential consumer's attention to effect a sale of the primary product.

SUMMARY OF THE INVENTION

It is a primary object of the present invention to provide a display panel which is extremely large and covers the entire width dimension of two vending machine units.

A further object of the present invention is to provide an extremely large primary product selection button which identifies the same product as the large display panel which extends across the width dimension of both vending machine units so as to attract the attention of a potential consumer.

It is another object of the present invention to provide a display unit wherein two vending machines are used in a side-by-side arrangement. A primary product may be positioned entirely or predominantly within a first vending machine unit and a plurality of secondary products may be positioned within a second vending machine unit.

A still further object of the present invention is to provide an enlarged primary product selection button which is positioned directly adjacent to the coin insertion slot, both being located on a first vending machine unit, and being offset a substantial distance from the secondary product buttons which are positioned on a second vending machine unit.

Another object of the present invention is to provide a display unit which is hinged adjacent to the top frame of the two vending machine units so as to be pivoted upwardly out of the way of the doors positioned on the front of each of the vending machine units.

A still further object of the present invention is to provide a support bracket mounted on the top frame of both of the vending machine units and including a rod which may be reciprocated outwardly therefrom so as to provide a support for the display.

These and other objects of the present invention are accomplished by providing an enlarged display panel which may be hinged to the top of two vending machine units positioned in a side-by-side arrangement. The two vending machine units are bolted together so as to give the appearance of a single unit with the enlarged display panel extending substantially across the entire width dimension of both of the vending machine units. A first vending unit includes a coin slot and a common electrical control system for controlling the dispensing of the products positioned in the first vending machine unit and the second vending machine unit. The first vending machine unit includes an enlarged primary product selection button which is positioned in close proximity to the coin insertion slot. The second vending machine unit includes a plurality of secondary product selection buttons which are offset by a substantial distance from the primary product selection button and are smaller in size so as to not initially attract the attention of the potential consumer. The enlarged display panel and the enlarged primary product selection button contain the same logo or identify the same product so as to attract the attention of a potential consumer to effect a purchase of the primary product. In addition, since the coin insertion slot is positioned directly adjacent to the enlarged primary product selection button there is an increased tendency for the consumer to purchase the primary product. Further, the first vending machine unit is designed to hold only or predominantly the primary product, thus providing an increased capacity for the primary product, whereas the secondary vending machine unit is designed to hold a plurality of secondary products.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
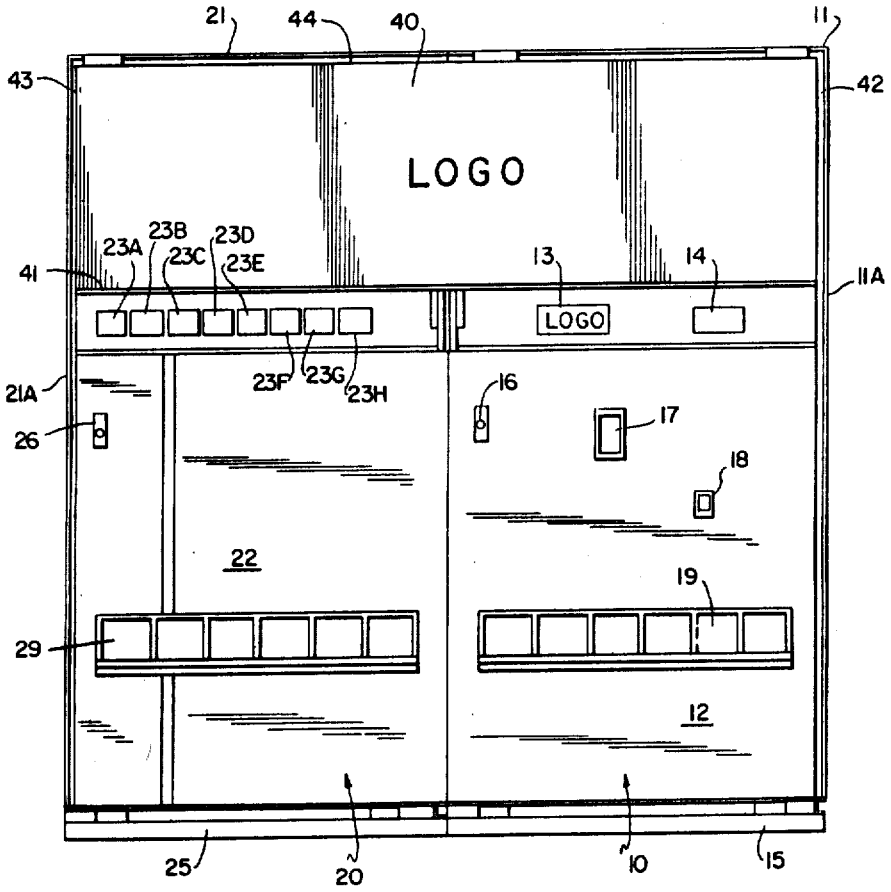
FIG. 1 is a front view of two vending machine units positioned in a side-by-side arrangement and illustrating the display panel and enlarged primary product selection button according to the present invention.

As illustrated in FIG. 1, the present invention is directed to a display panel which is designed to be used in combination with two vending machine units. A first vending machine unit 10 is positioned directly adjacent to the right of the second vending machine unit 20. Each of the vending machine units 10,20 includes a front door 12,22, respectively. The front door 12 positioned on the first vending machine unit 10 includes an enlarged primary product selection button 13 which is disposed directly adjacent to the coin insertion slot 14. In addition, the door 12 is hinged at the right hand side to a top frame member 11 and a lower frame member 15. The left hand side of the door includes a door opening handle 16 which may be locked to prevent access to the interior portion of the first vending machine unit. In addition, a pull tab slot 17 for depositing used pull tabs is disposed in the center of the door. Further, a coin return slot 18 is positioned directly below the coin insertion slot 14 to return change or refund money. The elongated slot 19 which extends substantially across the entire width dimension of the vending machine unit is provided as an opening through which the beverage product is dispensed.

Unlike the first vending machine unit 10, the second vending machine unit 20 includes a plurality of secondary product buttons 23A–23H which are smaller in size than the primary product selection button 13. The front door 22 is hinged at the right hand side to a top frame member 21 and a lower frame member 25 in a similar manner as the hinging arrangement of the front door 12 of the first vending machine unit 10. In addition, a door opening handle 26 is positioned to the left hand side of the front door 22 and may be locked to prevent access to the interior portion of the vending machine unit. Further, a slot 29 extends substantially across the entire width dimension of the second vending machine unit 20. The slot 29 provides an opening through which the secondary products are discharged from the second vending machine unit 20.

Figure 3:
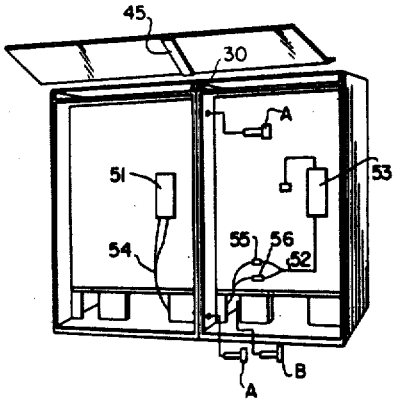
FIG. 3 is a front view illustrating the display panel prior to attachment to the vending units and for the sake of clarity omitting the doors which are attached to the front of each of the vending machine units.

As illustrated in FIG. 3, the two vending machine units 10,20 are bolted together by means of bolts A, B. The front bolts A firmly affix the sidewalls of both of the vending machine units together. Similarly, the rear bolts B affix the rear portion of the sidewalls of both of the vending machine units together. A coin mechanism 53 is positioned in the first vending machine unit 10 and is connected by means of a relay harness 52,54 to the relay box 51 positioned in the second vending machine unit 20. The relay harness includes two plugs 55,56 for connecting the coin mechanism 53 to the relay box 51 after the two units are affixed relative to each other. To overcome any difficulty in connecting the male and female members of the two plugs 55,56 one of the plugs is a twelve (12) way whereas the other is a fifteen (15) way. Therefore, it is virtually impossible to incorrectly connect the two plugs 55,56. In addition, the coin box associated with the coin mechanism 53 is extra large to accommodate the larger volume of coins deposited in the combined vending machine units according to the present invention.

The coin insertion slot 14 controls the dispensing of the products contained within both the first vending machine unit 10 and the second vending machine unit 20. After an individual inserts the correct change into the coin insertion slot the coin mechanism 53 indicates that the proper amount has been received and permits an individual to select either the primary product or one of the secondary products.

Figure 2:
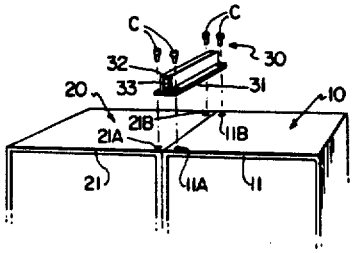
FIG. 2 is a perspective view illustrating the attachment of the support bracket on the top frame members of the two vending machine units.

As illustrated in FIG. 2, a support bracket 30 is mounted to the top frame members 11,21 of both of the vending machine units 10,20 by mean of bolts C. The support bracket 30 includes a lower plate 31 which is of a sufficient width so as to span the narrow gap between the vending machine units 10,20 and provide a sufficient surface area for overlapping onto the top frame members 11,21. The bolts C are inserted through openings in the lower plate 31 and are threaded into openings 11A, 11B, 21A and 21B positioned in the top frame members 11,21, respectively. By affixing the support bracket 30 to the upper frame members 11,21 the vending machine units 10,20 are firmly affixed relative to each other.

Figure 4:
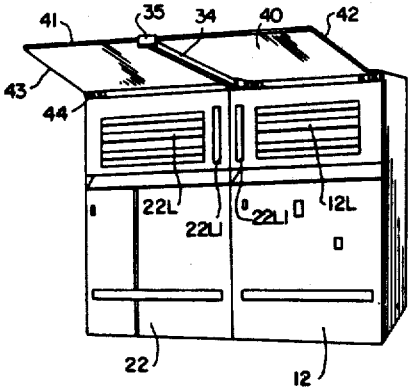
FIG. 4 is a front view illustrating the display exhibit hinged to the upper frame members of each of the vending machine units and being pivoted to the upward position and supported by the support bar.
Figure 5:
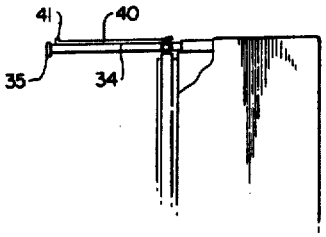
FIG. 5 is a side view of the display panel pivoted to the upward position as illustrated in FIG. 4.

As illustrated in FIGS. 2, 4 and 5, the support bracket 30 includes an upper housing 32 with a centrally disposed opening 33 extending therethrough. The centrally disposed opening 33 is designed to slidably receive a support rod 34 which is utilized to support the display panel 40 above the vending units when it is necessary to open the front doors 12,22. The support rod 34 is of a sufficient length so as to support the entire height dimension of the display panel 40. In addition, the support rod 34 includes a plate 35 positioned at the outermost end thereof which is designed to be positioned adjacent to the lowermost portion of the display panel. In this manner, an individual reciprocating or telescoping the support rod 34 out of the support bracket 30 will know that the rod is fully extended when the plate 35 is positioned adjacent to and beyond a lower frame 41 of the display panel 40.

The display panel 40 is normally vertically positioned adjacent to the top of the front doors of the two vending machine units 10,20. It is preferable to construct the display panel of a plastic material which may be illuminated from behind by means of lights 12L,22L and reflectors. Further, to avoid shadows in the display panel additional lights 12L1 and 22L1 may be positioned adjacent to the attached sidewalls of the vending machine units 10,20, respectively.

It is particularly important that the logo which appears on the display panel identifies the same product as the logo positioned on the enlarged primary product selection button 13. A potential consumer depositing coins in the coin insertion slot 14 will have a tendency to select the primary product selection button 13 because of the similarity of this button to the display panel which extends substantially across the entire width dimension of both vending machine units and because the enlarged primary product selection button 13 is disposed in close proximity to the coin insertion slot 14. In addition, the secondary product buttons 23A–23H are displaced a substantial distance from the coin insertion slot 14 and require an additional effort for an individual to select one of the secondary products. Thus, an individual has a tendency to select the conveniently positioned primary product.

The display panel 40 includes a frame 41–44 which extends around the entire peripheral surface of the display panel. The upper frame member 44 is connected to the top frame members 11,21 by means of a piano hinge which would extend substantially across the entire width dimension of the combined vending machine units. In addition, the hinge permits the display panel 40 to be pivoted upwardly away from the front doors 12,22 so as to permit the doors to be opened to provide access for refilling, servicing and collecting coins from the coin mechanism 53. When the display panel 40 is pivoted upwardly the support rod 34 is reciprocated or telescoped out of the support bracket 30 so as to provide a means for holding the display panel in the upward position.

The side frame member 42,43 are overlapped by the outer sidewall frame members 11A,21A of the vending machine units. This overlapping relationship prevents tampering with the piano hinge which may result in an unauthorized removal of the display panel 40 from the vending machine units.

The piano hinge which supports the display panel 40 on the upper frame members 11,21 of the vending machine units is designed to permit the pivoting of the display panel 40 upwardly and above the units when it is desired to open the front doors 12,22. This pivoting upwardly is necessary so that there is a sufficient opening between the upper frame portion 44 of the display panel 40 and the top of the vending machine units to permit the reciprocating or telescoping outwardly of the support rod 34. In addition, the display panel 40 includes a central frame member 45 which joins the upper frame member 44 to the lower frame member 41. The central support frame 45 is designed to mate with the support rod 34 and adds rigidity to the display panel 40 which is, as stated above, normally constructed of a plastic material. In this manner, the weight of the display panel 40 will be supported by the central support frame 45 which is in engagement with the support rod 34.

As illustrated in FIG. 4, the front doors 12,22 of the vending machine units include a plurality of lights 12L,22L which are positioned beneath the display panel 40. When the display panel 40 is in its normal position, as illustrated in FIG. 1, the plurality of lights 12L,22L illuminate the display panel 40 and provide a down lighting on the primary product selection button 13 and the secondary product buttons 23A–23H. In addition, as is conventional, the product selection buttons are also illuminated by means of a small light positioned behind each of the product selection buttons. Further, shadows produced by the central support frame 45 are substantially eliminated by means of the centrally disposed lights 12L1 and 22L1.

Because of the increased capacity of the combined vending machine units according to the present invention it is extremely important to make the unit completely tamper-proof. Therefore, the hinges which mount the front doors 12,22 and the locks on the door opening handles 16 and 26 are designed to be heavy duty relative to the conventional hinges and locking mechanisms of single vending machine units. In addition, the support rod 34 which includes a plate 35 positioned at the outermost end thereof can be designed to be locked to the support bracket 30 so that the plate 35 acts as an additional lock to prevent the opening of the doors 12,22.

From the description hereinabove, it is apparent that the primary emphasis of the present invention is to provide an extremely large display panel which contains the same product indentification as an enlarged primary product selection button positioned directly adjacent to the coin insertion slot. In this manner, a potential consumer is attracted by the large display panel, the enlarged primary product selection button which increases the tendency of the consumer to purchase the primary product.

In a preferred embodiment of the present invention, the first vending machine unit 10 is designed to hold only the primary product. In this manner, approximately 300 containers or 40 percent of the total capacity of the two vending machine units can be stocked with the primary product. The second vending machine unit 20 is designed to hold a plurality of various secondary products. In a preferred embodiment, the dispensing mechanism positioned within the second vending machine unit 20 may have four secondary product selection buttons which can dispense a total of 37 secondary products each. In addition, the second vending machine unit 20 may have four additional selection buttons which may dispense a total of 75 secondary products each. In this manner, an individual servicing and refilling the vending machine units may stock certain secondary products in the second vending machine unit to have a capacity of 75 containers or a multiple thereof. In addition, certain secondary products in the second vending machine unit may be stocked to have a capacity of 37 containers or a multiple thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display panel for use in combination with first and second vending machine units positioned in a side-by-side relationship comprising:

a sign panel extending across substantially the entire width dimension of said vending machine units and including a logo or product identification thereon;

an enlarged primary product selection button with said logo or same product identification positioned thereon and being disposed on said first vending machine unit directly adjacent to a coin insertion slot therein; and a plurality of secondary product selection buttons disposed on the second vending machine unit which are displaced a substantial distance away from the primary product selection button and said coin insertion slot of said first vending machine unit, said secondary product selection buttons being smaller relative to said enlarged primary product selection button;

said coin insertion slot of said first vending machine unit being in communication with a single coin mechanism which controls product dispensing of both the first and second vending machine units;

whereby the enlarged primary product selection button being disposed directly adjacent to said coin insertion slot and including the same logo or product identification as said sign panel attracts the attention of a potential consumer to effect a sale of the primary product.

2. A display panel according to claim 1, wherein said sign panel is pivotally mounted to an upper frame member of said vending machine units, whereby a front door mounted on each of said vending machine units is permitted to open when said sign panel is pivoted upwardly.

3. A display panel according to claim 2, and further including means for supporting said pivotally mounted sign panel above said vending machine units.

4. A display panel according to claim 2, wherein said pivotally mounted sign panel is hinged to said upper frame member of said vending machine units.

5. A display panel according to claims 3 or 4, wherein said means for supporting said pivotally mounted sign panel includes a support bracket and a support rod reciprocably mounted therein to selectively support said sign panel above said vending machine units to permit opening of said front doors.

6. A display panel according to claim 5, said support rod including a plate member mounted on the outermost end thereof to indicate that said support rod is fully reciprocated to support the entire height dimension of said display panel.

7. A display panel according to claim 5, said sign panel including a frame mounted around the periphery thereof and a central support member adapted to engage said support rod when said sign panel is supported above said vending machine units.

8. A display panel according to claim 6, wherein said support rod is normally substantially positioned with said support bracket and may be locked therein so that said plate member abuts against and locks said front doors of said vending machine units.

9. A display panel according to claim 1, and further including illuminating means for illuminating said sign panel.

10. A display panel according to claim 7, wherein said sign panel is normally vertically positioned adjacent to an upper portion of said front door of said vending machine units and said frame of said sign panel is overlapped with outer sidewall frame members of said vending machine units to prevent tampering with said means for pivotally mounting said display panel.

11. A display panel according to claim 1, and further including means for operatively connecting said single coin mechanism of said first vending machine unit to a relay mechanism of said second vending machine unit to permit said single coin mechanism of said first vending machine unit to control the product dispensing of both the first and second vending machine units.

12. A display panel for use in combination with first and second vending machine units positioned in a side-by-side relationship comprising:

a sign panel extending across substantially the entire width dimension of said vending machine units and including a logo thereon;

said sign panel being pivotally mounted on an upper frame member of said vending machine units and including a central support member;

means for supporting said pivotally mounted sign panel including a support bracket and a support rod reciprocably mounted therein to selectively abut against said central support of said sign panel to support said sign panel above said vending machine units thereby permitting the opening of a front door mounted on each of said vending machine units;

an enlarged primary product selection button with said logo or same product identification positioned thereon and being disposed on said first vending machine unit directly adjacent to a coin insertion slot therein; and a plurality of secondary product selection buttons disposed on the second vending machine unit which are displaced a substantial distance away from the primary product selection button and said coin insertion slot of said first vending machine unit;

said coin insertion slot of said first vending machine unit being in communication with a single coin mechanism which controls product dispensing of both the first and second vending machine units;

whereby the enlarged primary product selection button being disposed directly adjacent to said coin insertion slot and including the same logo or product identification as said sign panel attracts the attention of a potential consumer to effect a sale of the primary product.

13. A display panel for use in combination with first and second vending machine units positioned in a side-by-side relationship comprising:

a sign panel extending across substantially the entire width dimension of said vending machine units and including a logo or product identification thereon, said sign panel being pivotally mounted to an upper frame member of said vending machine units, whereby a front door mounted on each of said vending machine units is permitted to open when said sign panel is pivoted upwardly;

means for supporting said pivotally mounted sign panel including a support bracket and a support rod reciprocably mounted therein to selectively support said sign panel above said vending machine units to permit opening of said front doors; and a primary product selection button with said logo or same product identification positioned thereon and being disposed on said first vending machine unit.

14. A display panel for use in combination with first and second vending machine units positioned in a side-by-side relationship comprising:

a sign panel extending across substantially the entire width dimension of said vending machine units and including a logo or product identification thereon, said sign panel being pivotally mounted to an upper frame member of said vending machine units, whereby a front door mounted on each of said vending machine units is permitted to open when said sign panel is pivoted upwardly;

an enlarged primary product selection button with said logo or same product identification positioned thereon and being disposed on said first vending machine unit directly adjacent to a coin insertion slot therein; and a plurality of secondary product selection buttons disposed on the second vending machine unit which are displaced a substantial distance away from the primary product selection button and said coin insertion slot of said first vending machine unit;

said coin insertion slot of said first vending machine unit being in communication with a single coin mechanism which controls product dispensing of both the first and second vending machine units;

whereby the enlarged primary product selection button being disposed directly adjacent to said coin insertion slot and including the same logo or product identification as said sign panel attracts the attention of a potential consumer to effect a sale of the primary product.

15. A display panel according to claim 13 or 14, wherein said pivotally mounted sign panel is hinged to said upper frame member of said vending machine units.

16. A display panel according to claim 13 or 14, said support rod including a plate member mounted on the outermost end thereof to indicate that said support rod is fully reciprocated to support the entire height dimension of said display panel.

17. A display panel according to claim 13 or 14, said sign panel including a frame mounted around the periphery thereof and a central support member adapted to engage said support rod when said sign panel is supported above said vending machine units.

18. A display panel according to claim 15, wherein said support rod is normally substantially positioned within said support bracket and may be locked therein so that said plate member abuts against and locks said front doors of said vending machine units.

19. A display panel according to claim 13 or 14, and further including illuminating means for illuminating said sign panel.

20. A display panel according to claim 16, wherein said sign panel is normally vertically positioned adjacent to an upper portion of said front door of said vending machine units and said frame of said sign panel is overlapped with outer sidewall frame members of said vending machine units to prevent tampering with same means for pivotally mounting said display panel.

*21. A vending machine comprising:*

*a sign panel including a logo or product identification thereon;*

*an enlarged primary product selection button with said logo or same product identification positioned thereon and being disposed on said vending machine directly adjacent to a coin insertion slot therein; and*

*a plurality of secondary product selection buttons disposed on the vending machine on the opposite side of said enlarged primary product selection button from said coin insertion slot of said vending machine, said secondary product selection buttons being smaller relative to said enlarged primary product selection button;*

*said coin insertion slot of said vending machine being in communication with a coin mechanism which controls product dispensing of the primary and secondary products;*

*whereby the enlarged primary product selection button being disposed directly adjacent to said coin insertion slot and including the same logo or product identification as said sign panel attracts the attention of a potential consumer to effect a sale of the primary product.*

* * * * *